US012518186B2

(12) United States Patent
Najafi et al.

(10) Patent No.: US 12,518,186 B2
(45) Date of Patent: Jan. 6, 2026

(54) METHOD AND ARCHITECTURE FOR FUZZY-LOGIC USING UNARY PROCESSING

(71) Applicant: University of Louisiana at Lafayette, Lafayette, LA (US)

(72) Inventors: Mohammadhassan Najafi, Lafayette, LA (US); Amir Hossein Jalilvand, Tehran (IR); Mahdi Fazeli, Istanbul (TR)

(*) Notice: Subject to any disclaimer, the term of this patent is extended or adjusted under 35 U.S.C. 154(b) by 1136 days.

(21) Appl. No.: 17/340,834

(22) Filed: Jun. 7, 2021

(65) Prior Publication Data

US 2021/0383264 A1 Dec. 9, 2021

Related U.S. Application Data

(60) Provisional application No. 63/036,063, filed on Jun. 8, 2020.

(51) Int. Cl.
*G06N 5/048* (2023.01)
*G06F 16/2455* (2019.01)
*G06N 7/02* (2006.01)

(52) U.S. Cl.
CPC ....... *G06N 5/048* (2013.01); *G06F 16/24554* (2019.01); *G06N 7/023* (2013.01); *G06N 7/026* (2013.01)

(58) Field of Classification Search
CPC ..................................................... G06N 5/048
See application file for complete search history.

(56) References Cited

U.S. PATENT DOCUMENTS

| 5,422,979 | A | * | 6/1995 | Eichfeld | G06F 1/0356 706/900 |
| 5,561,738 | A | * | 10/1996 | Kinerk | G06N 7/04 706/900 |
| 2020/0394508 | A1 | * | 12/2020 | Tresp | G06N 3/08 |

* cited by examiner

*Primary Examiner* — Eric Nilsson
(74) *Attorney, Agent, or Firm* — Ted M. Anthony (57) ABSTRACT

Efficient hardware design of the fuzzy-inference engine has become necessary for high-performance applications. The disclosed technology applies unary processing to the platform of fuzzy-logic. To mitigate the latency, the proposed design processes right-aligned bit-streams. A one-hot decoder is used for fast detection of the bit-stream with maximum value. Implementing a fuzzy-inference engine with 81 fuzzy-inference rules, the disclosed architecture provides 82%, 46%, and 67% saving in the hardware area, power and energy consumption, respectively, and 94% reduction in the number of used LUTs compared to conventional binary implementation.

10 Claims, 6 Drawing Sheets

$$\left\{\begin{array}{l} 0,0,0,0,0,0,1,1,1,1,1,1,1,1,1,1 \text{ agg1}=0.625 \\ 0,0,0,0,0,0,0,1,1,1,1,1,1,1,1,1 \text{ agg2}=0.5 \\ 0,1,1,1,1,1,1,1,1,1,1,1,1,1,1,1 \text{ agg3}=0.938 \\ 0,0,0,1,1,1,1,1,1,1,1,1,1,1,1,1 \text{ agg4}=0.812 \\ 0,0,0,0,0,0,0,0,0,0,0,0,0,0,1,1 \text{ agg5}=0.125 \end{array}\right.$$

| Design Methodology | Input Precision (M) | | | | | |
|---|---|---|---|---|---|---|
| | 2 | 3 | 4 | 5 | 6 | 7 |
| Conventional Binary | 1 | 1 | 1 | 1 | 1 | 1 |
| Proposed 5Inp./Out. | 1.51 | 2.22 | 3.67 | 6.92 | 12.73 | 24.82 |
| Proposed 7Inp./Out. | 1.61 | 2.23 | 3.78 | 6.52 | 12.44 | 23.94 |
| Proposed 9Inp./Out. | 1.26 | 1.90 | 2.81 | 4.68 | 8.77 | 16.78 |

FIGURE 11

| $Inp_1$ \ $Inp_2$ | PL | PM | PS | Z | NS | NM | NL |
|---|---|---|---|---|---|---|---|
| PL | PL | PL | PL | PL | PL | PS | PS |
| PM | PL | PL | PM | PM | PM | PS | PS |
| PS | PS | PS | PS | Z | Z | PS | PS |
| Z | Z | Z | Z | Z | Z | Z | Z |
| NS | NS | NS | Z | Z | NS | NS | NS |
| NM | NL | NL | NM | NM | NM | NS | NL |
| NL | NL | NL | NL | NL | NL | NM | NM |

FIGURE 12

| Design | M | Area ($\mu m^2 \times 1000$) Conv. | Area Prop. | Power ($mW$) (@max freq) Conv. | Power Prop. | Critical Path ($ns$) Conv. | Critical Path Prop. | Energy ($pJ$) Conv. | Energy Prop. | Hardware Usage (# of LUTs) Conv. | Hardware Prop. |
|---|---|---|---|---|---|---|---|---|---|---|---|
| 5Inp./Out. | 2 | 1.873 | 0.811 | 0.289 | 0.232 | 1.37 | 0.95 | 0.396 | 0.355 | 96 | 34 |
|  | 3 | 2.736 | 1.108 | 0.395 | 0.304 | 3.33 | 0.98 | 1.316 | 0.667 | 235 | 38 |
|  | 4 | 4.446 | 1.482 | 0.506 | 0.376 | 3.50 | 0.99 | 1.770 | 1.413 | 326 | 39 |
|  | 5 | 5.785 | 1.685 | 0.509 | 0.351 | 3.92 | 1.14 | 1.996 | 2.616 | 395 | 42 |
|  | 6 | 7.072 | 2.000 | 0.596 | 0.401 | 4.63 | 1.18 | 2.761 | 5.890 | 534 | 47 |
|  | 7 | 8.350 | 2.392 | 0.583 | 0.380 | 5.62 | 1.25 | 3.28 | 11.379 | 808 | 62 |
| 7Inp./Out. | 2 | 3.047 | 1.123 | 0.496 | 0.425 | 2.71 | 1.14 | 1.344 | 0.734 | 182 | 65 |
|  | 3 | 5.578 | 1.559 | 0.407 | 0.285 | 5.02 | 1.20 | 2.043 | 0.763 | 403 | 72 |
|  | 4 | 7.516 | 2.079 | 0.494 | 0.345 | 5.93 | 1.27 | 2.931 | 1.616 | 606 | 75 |
|  | 5 | 9.534 | 2.35 | 0.474 | 0.305 | 7.88 | 1.37 | 3.740 | 2.895 | 643 | 78 |
|  | 6 | 11.439 | 2.807 | 0.460 | 0.284 | 9.15 | 1.49 | 4.212 | 5.395 | 896 | 79 |
|  | 7 | 13.515 | 3.317 | 0.532 | 0.323 | 9.85 | 1.61 | 5.244 | 12.906 | 1342 | 83 |
| 9Inp./Out. | 2 | 5.205 | 1.478 | 0.499 | 0.415 | 3.72 | 1.32 | 1.857 | 0.691 | 268 | 104 |
|  | 3 | 8.795 | 1.991 | 0.513 | 0.371 | 5.51 | 1.33 | 2.830 | 0.939 | 690 | 113 |
|  | 4 | 12.230 | 2.669 | 0.536 | 0.387 | 7.16 | 1.41 | 3.842 | 1.537 | 1043 | 115 |
|  | 5 | 15.798 | 3.030 | 0.552 | 0.319 | 8.51 | 1.52 | 4.701 | 2.271 | 1283 | 117 |
|  | 6 | 19.406 | 3.615 | 0.638 | 0.365 | 8.60 | 1.54 | 5.491 | 4.938 | 1546 | 120 |
|  | 7 | 22.856 | 4.265 | 0.703 | 0.380 | 10.65 | 1.67 | 7.496 | 10.648 | 2321 | 139 |

FIGURE 13

METHOD AND ARCHITECTURE FOR FUZZY-LOGIC USING UNARY PROCESSING

CROSS REFERENCE TO RELATED APPLICATION

This application claims priority to U.S. Provisional Application No. 63/036,063 titled FUZZY-LOGIC UTILIZING UNARY BIT-STREAM PROCESSING filed on Jun. 8, 2020.

STATEMENT REGARDING FEDERALLY SPONSORED RESEARCH OR DEVELOPMENT

Not applicable.

REFERENCE TO A "SEQUENCE LISTING", A TABLE, OR A COMPUTER PROGRAM

Not applicable.

DESCRIPTION OF THE DRAWINGS

The drawings constitute a part of this specification and include exemplary examples of the METHOD AND ARCHITECTURE FOR FUZZY-LOGIC USING UNARY PROCESSING, which may take the form of multiple embodiments. It is to be understood that, in some instances, various aspects of the invention may be shown exaggerated or enlarged to facilitate an understanding of the invention. Therefore, drawings may not be to scale. For the purposes of clarity, not every component may be labeled in every drawing.

FIELD OF THE INVENTION

The disclosed invention is in the field of Fuzzy control and deterministic stochastic computing, specifically in the design of architectures that can perform fuzzy logic using unary processing.

BACKGROUND OF THE INVENTION

Hardware-based processing is bounded by strict design constraints such as low power consumption, small circuit area, and reliability. Power and area costs, in particular, are the main concerns in designing embedded systems. Weighted binary radix has been the dominate format for representation of data in these systems. Computation on this representation is complex and, as a result, costly as each bit has its own weight according to its position. Considering the complexity of conventional binary designs, unconventional design techniques are receiving more and more attention. Unary computing is an unconventional technique that offers low-cost design.

The unary computing paradigm has some common characteristics to stochastic computing (SC); however, it is deterministic and produces completely accurate results. The operations are mainly on the numbers in the [0, 1] interval. Unlike the weighted binary format, all digits are weighted equally in this paradigm. Numbers are encoded uniformly by a sequence of 1 s followed by a sequence of 0 s (or vice versa). The streams in this format are referred to in the art as "unary bit-streams". Independent of the length, the value of a unary bit-stream is determined by the frequency of 1's. For example, 1100 and 111000 are two unary bit-streams representing 0.5.

Figure 2:
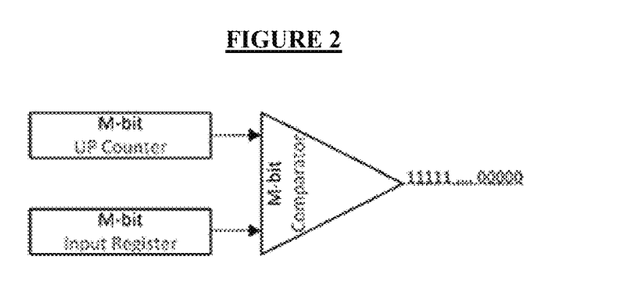
FIG. 2 provides a logic diagram of a left-aligned unary bit-stream generator.
Figure 3:
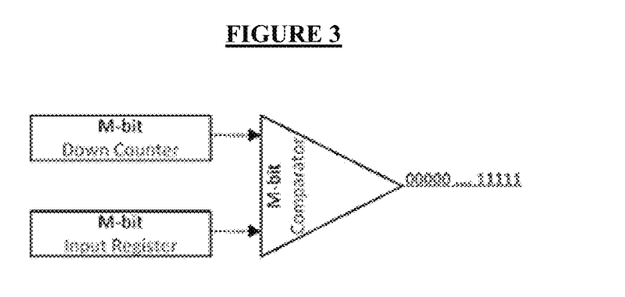
FIG. 3 provides a logic diagram of a right-aligned unary bit-stream generator.
Figure 4:
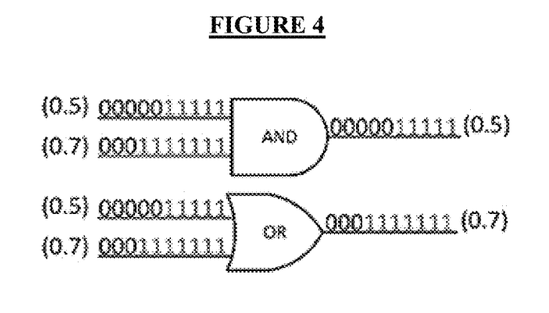
FIG. 4 provides logic diagrams of examples of Min (using AND gate) and Max (using OR gate) operations in unary computing.

Processing data in the unary domain requires conversion of the data from conventional binary to unary bit-stream representation. A stream of $2^M$ bits is required to demonstrate a real number with resolution of $2^{-M}$. FIGS. 2 and 3 illustrate a left-aligned and a right-aligned unary bit-stream generator, respectfully, each built from a counter and a comparator. FIG. 4 exemplifies the minimum (Min) and maximum (Max) value functions on unary bit-streams. As can be seen, a single AND gate implements the Min value function when it is fed with two same-length unary bit-streams. An OR gate, on the other hand, performs Max function when connected to two same-length unary bit-streams. This implementation is independent of the precision of data.

Figure 5:
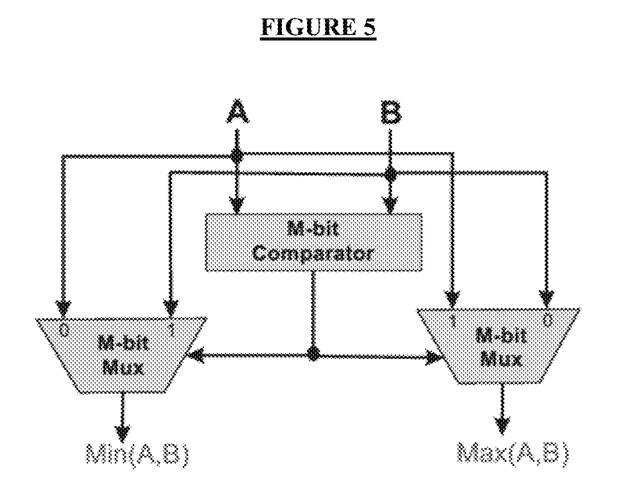
FIG. 5 provides a flowchart of the implementation of Min and Max value functions in the conventional binary domain.

The same design can process input data with higher precision by processing longer bit-streams. Implementing the Min and Max value functions in the weighted binary domain is more complex, and dependent to the precision of data. As shown in FIG. 5, the conventional binary implementation of these functions requires an n-bit comparator and two n-bit multiplexers (MUXs), resulting in a higher hardware area and power cost.

Simplicity of hardware design is the main advantage of unary computing. A standard AND gate fed with uncorrelated (independent) unary bit-streams implements the multiplication operation. Low-cost design of Min and Max value functions based on correlated unary bit-streams have been previously discussed in the art for low-cost design of sorting network circuits.

Fuzzy-logic systems were first introduced in 1965. Fuzzy-logic hardware has been designed in both analog and digital domains. Research findings confirm that analog hardware is rather simple. However, it lacks accuracy and reliability. Digital hardware, on the other hand, benefits from a higher accuracy and reliability. Nonetheless, it is often more complex and lacks adequate speed compared to analog design. The Generalized Modus Ponens (GMP) of fuzzy inference rules (single rule with single antecedent) are stated as below:

Rule: If input is A then output is B
Fact: Input is A'
Consequence: Output is B' where A, B, A', B' are fuzzy sets. The rule is described by the fuzzy implication function R=A→B, where R is a fuzzy relation and, when the "min" operator is used, its membership functions (matching degree) are computed as:

$$\mu_R(u,v) = \min(\mu_A(u), \mu_B(v)); u \in U, v \in V$$

where $\mu_R(u, v)$, $\mu_A(u)$, and $\mu_B(v)$ are membership functions of R, A, and B, and U and V are universes of discourse of A and B, respectively. The Consequence of the fuzzy interface rule is determined by the fuzzy composition B'=A'°R and, when the "max-min" operator is used, the membership function value of B' is computed as:

$$\mu_{B'}(v) = \max \min(\mu_{A'}(u), \mu_R(u,v))$$

where $\mu_{B'}(v)$ and $\mu_{A'}(u)$ are membership functions of B' and A', respectively.

Figure 6:
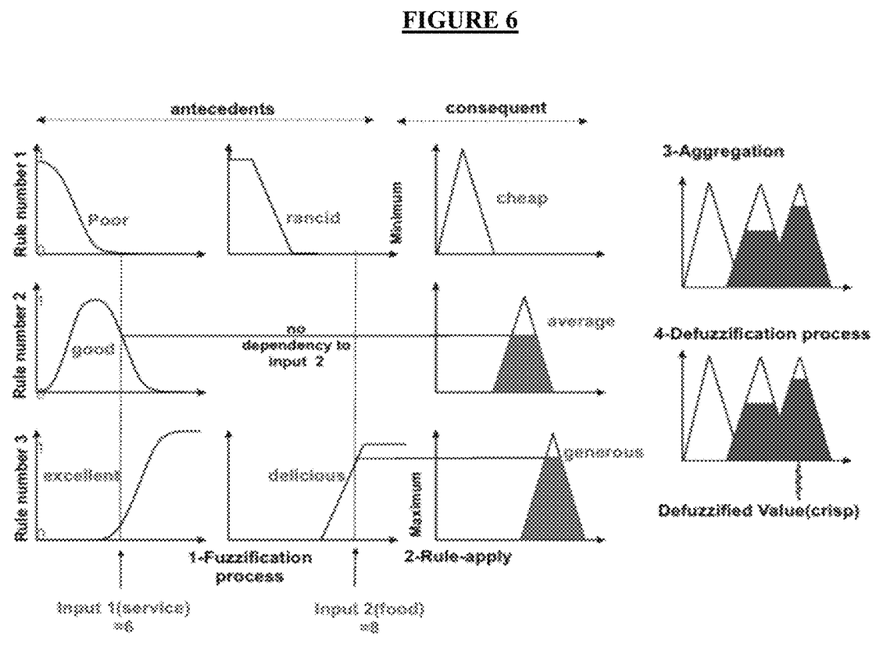
FIG. 6 provides a graphical representation of the fuzzy interface process in a basic tipping problem.

The following example describes the fuzzy interference process in a basic problem about tipping at a restaurant (see FIG. 6). The rules (with multiple antecedents) are as follows:
Rule 1: If service is poor And food is rancid then tip is low.
Rule 2: If service is good then tip is average.
Rule 3: If service is excellent Or food is delicious then tip is generous.

Figure 1:
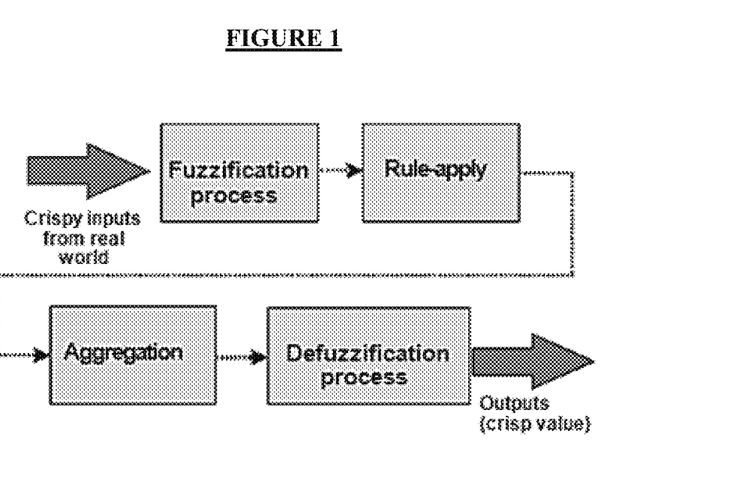
FIG. 1 provides a flowchart of the inference mechanism in fuzzy-logic applications.

The theory of fuzzy-logic has been investigated in numerous applications including controlling systems, real-time embedded systems, robotics, security, image and signal processing, telecommunications, decision-making support systems, and chemical industry. As illustrated in FIG. 1, most fuzzy-logic systems use the mechanism of inference which employs the following steps: (1) a fuzzification process, which converts crisp (non-fuzzy) inputs to fuzzy-linguistic values; (2) rule-apply or application of inference rules; (3) aggregation, where the results of the rule-apply process are aggregated; and (4) defuzzification process, wherein the fuzzy-linguistic values are converted to the crisp value of outputs.

In contrast to the two-valued logic in the binary sets (true or false), fuzzy-logic variables have truth values in the [0, 1] interval, the acceptable range of data in unary processing. Previously, SC has been used in designing digital fuzzy-logic controller. Lack of generality in the type of membership functions, inaccuracy of computations, and long processing time due to processing random bit-streams are the main limitations of designs known in the art. In one embodiment in the art, a fuzzy probability analysis is transformed into simple bit-wise operations on stochastic bit-streams. While that model accomplishes a faster convergence and requires a shorter runtime compared to a Monte Carlo simulation, still long random bit-streams of 100 to 1000 bits must be processed.

SUMMARY OF THE INVENTION

The disclosed architecture applies the concept of unary computing to the platform of fuzzy-inference engine. A low-cost and high-performance unary-stream-based fuzzy-inference controller is developed. The processing is deterministic and produces the same output as the conventional binary design. An overhead is the cost of converting data from weighted binary to unary bit-streams using a unary number generator unit. The more inference rules, the higher the saving in the hardware cost. Synthesis results for the case of implementing a fuzzy-inference controller with 81 inference rules show up to 82% saving in area, 46% reduction in power, 67% saving in energy consumption, and 94% reduction in the Lookup table (LUT) usage compared to the conventional binary design.

DETAILED DESCRIPTION OF THE INVENTION

Figure 7:
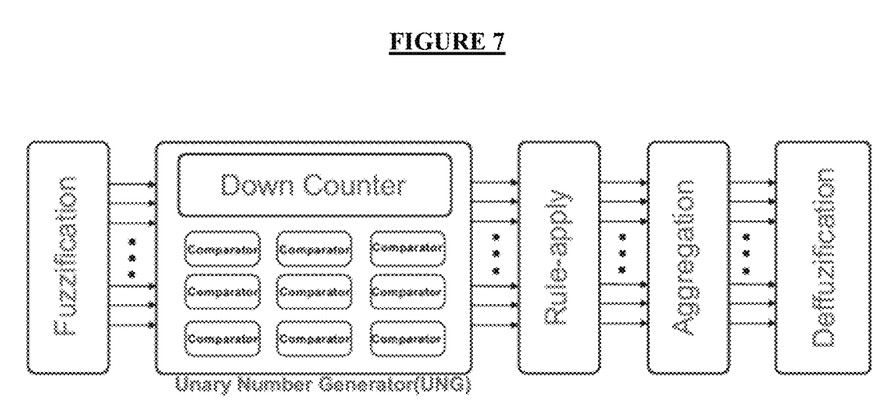
FIG. 7 provides a diagram of the disclosed architecture.

FIG. 7 provides a structural overview of the architecture for the fuzzy-inference engine. First, the input value (crisp value) is converted to a linguistic value based on the input membership function. The numbers in the range of [0, 1] are converted to unary bit-streams using a unary number generator (UNG) unit. A single down-counter is shared in generating all unary bit-streams to minimize the bit-stream generation overhead. Rule-apply and Aggregation processes are Min and Max-based functions and hence, implemented using simple AND and OR logic gates.

Figure 8:
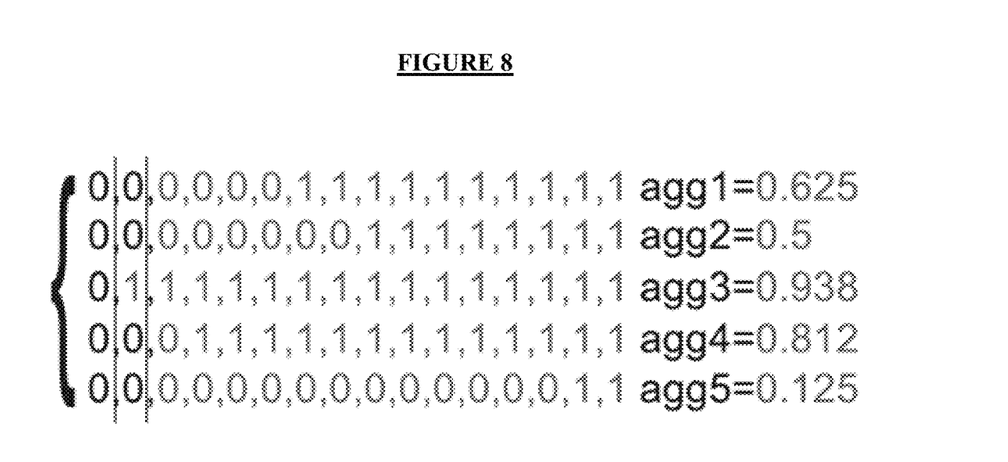
FIG. 8 provides an example of the defuzzification process.

FIG. 8 represents an example of the defuzzification process. agg1, agg2, agg3, agg4 and agg5 are the aggregated values of the fuzzy inference process. The defuzzification process needs to find the index of the aggregated value with maximum value. In the example shown in FIG. 8, agg3 has the maximum value and hence its index (i.e., 3) must be sent to the output. Due to using a down-counter in generating bit-streams, the aggregated values are converted to right-aligned unary bit-streams (first all 0s and then all 1s). When processing some right-aligned unary bit-streams, the bit-stream that generates the first "1" is the bit-stream with maximum value. So, there is actually no need to generate and process full length bit-streams (i.e., $2^n$-bit bit-streams for n-bit precision data) to find the index of the input with maximum value. In practice, this index is found in a shorter time than $2^n$ cycles. For example, for the set of inputs given in FIG. 8, the index of the input with maximum value is found after only two clock cycles.

Figure 9:
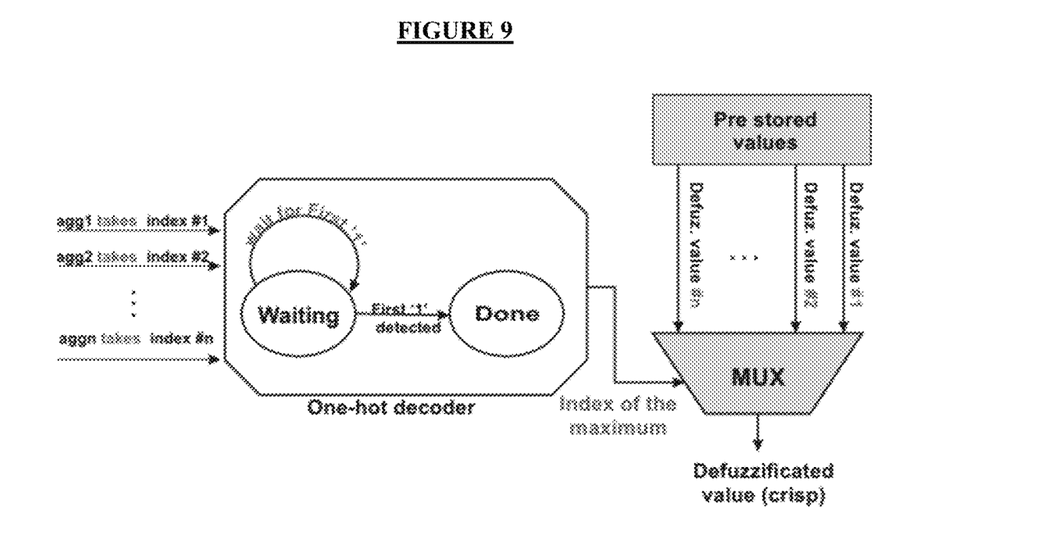
FIG. 9 provides a diagram of the disclosed architecture for the defuzzification process.

FIG. 9 demonstrates the proposed architecture for the defuzzification process. The outputs of the Aggregation process, namely agg1, agg2, . . . , and aggn, take index 1, index 2, . . . , and index n, respectively. The unary bit-streams corresponding to the aggregated values are transmitted to a one-hot decoder to detect the bit-stream that generates the first 1 (i.e., the bit-stream with maximum value.) As soon as the one-hot decoder detects one of the patterns (1,0,0,0,0), (0,1,0,0,0), (0,0,1,0,0), (0,0,0,1,0), or (0,0,0,0,1), the corresponding index (e.g., 3 in the example of FIG. 8) will be sent to the MUX unit to select the corresponding defuzzification value.

Figure 10:
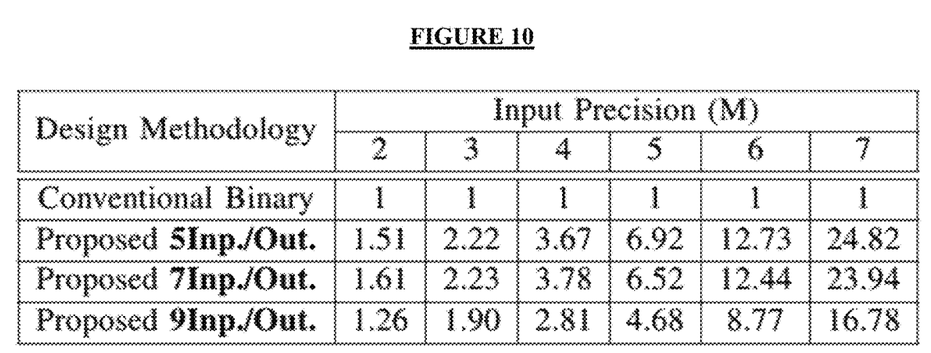
FIG. 10 provides a chart of the average number of processing cycles for the proposed design.

FIG. 10 reports the average number of processing cycles for the proposed fuzzy-interface architecture for three different number of input/output membership values when processing 20 randomly selected sets of input data. As can be seen, the average number of processing cycles with the proposed unary design are significantly smaller than $2^n$, the required bit stream length to accurately represent an n-bit precision data in the unary domain.

Figure 11:
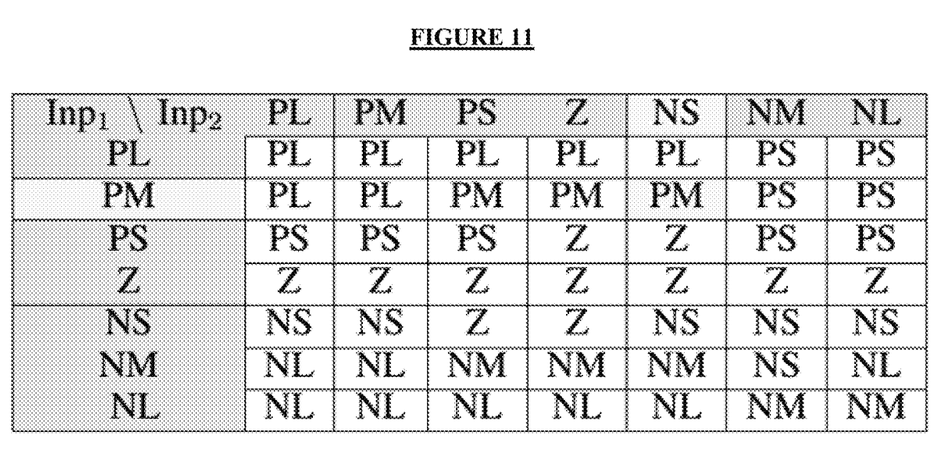
FIG. 11 provides a fuzzy rule table in the case of seven input/output fuzzy-linguistic values.

The architecture was evaluated through an implementation of three different fuzzy-interference controllers with 25, 49, and 81 interference rules (five, seven, and nine input/output fuzzy-linguistic values) for a system with two input/output variables that controls two velocities. FIG. 11 provides the fuzzy rule table for the case of seven input/output fuzzy-linguistic values.

Figure 13:
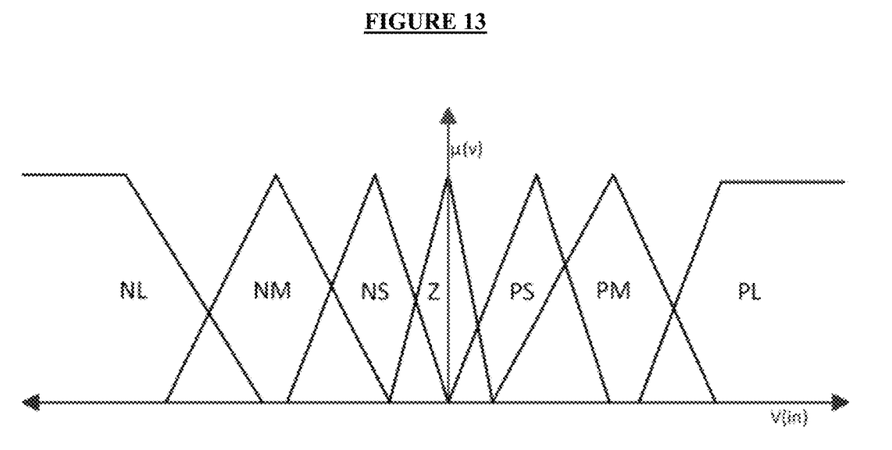
FIG. 13 provides a graphical representation of the input/output membership function for the case of seven input/output linguistic values.

The subject matter of the present invention has been disclosed as being intended for use in computing; however, those having skill in the art may recognize the applicability of the designs and methods to other industries. Nothing in this disclosure is intended to limit the design to one industry or technology. FIG. 13 demonstrates the graphical representation of the input/output membership function for the case of seven input/output fuzzy linguistic values. NL, NS, NM, Z, PS, PM, PL are the abbreviations for Negative Large, Negative Small, Negative Medium, Zero, Positive Small, Positive Medium and Positive Large, respectively. For example, if input1 is PM and input2 is NS, the output is PM.

For performance evaluation, both the proposed unary bit-stream-based and the conventional design of the fuzzy-inference controller were implemented in MATLAB. For hardware cost comparison, RTL VHDL descriptions of the proposed and the conventional binary design were developed. The designs were synthesized using the Synopsys Design Compiler with the 45 nm FreePDK library and also with Xilinx Vivado v.2018.2 on a Virtex-7 FPGA. The synthesis results are reported for different data bit-widths (i.e., M=2, 3, 4, 5, 6, and 7).

Figure 12:
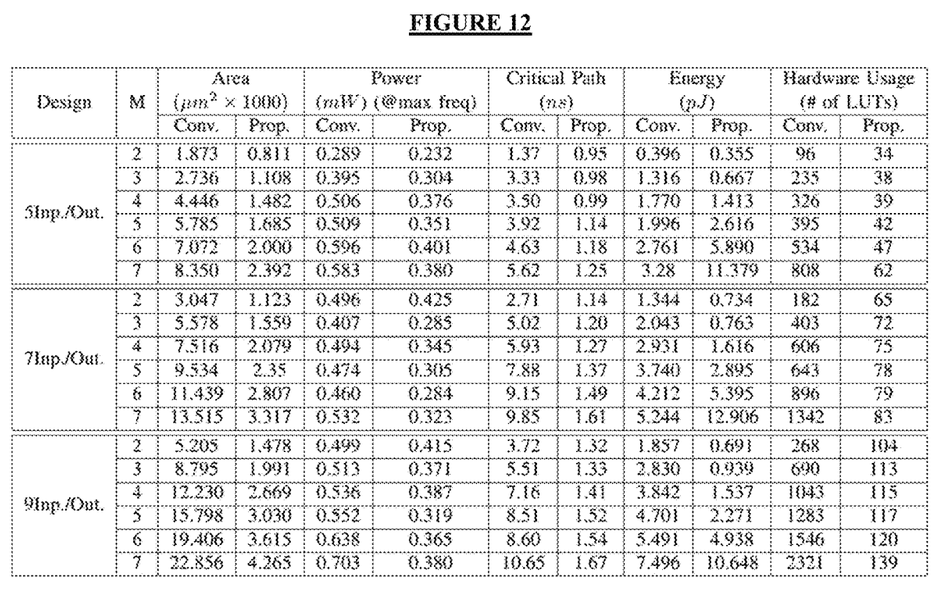
FIG. 12 provides a chart comparison of area, power, delay, energy consumption and hardware usage by number of LUTs.

FIG. 12 reports the synthesis results in terms of hardware footprint area, power consumption at maximum working frequency, critical path latency, energy consumption, and the number of LUTs used to implement the fuzzy-logic designs. The energy consumption of the proposed design is calculated by finding power×critical path latency×average number of cycles where the average number of cycles is extracted from FIG. 10. In case of implementing the fuzzy-logic controller with 25 inference rules (5 Inp./Out.) up to 72% saving in the hardware area, 35% reduction in the power consumption, 50% improvement in the energy consumption, and 92% saving in the occupied LUTs are observed. As can be seen in the reported numbers, by increasing the number of inference rules a higher saving in the hardware design cost can be achieved. For instance, for the case of implementing a fuzzy-inference engine with 49 inference rules (7 Inp./Out.), up to 75, 39, 63, and 93 percent improvements in the hardware area, power, energy, and occupied LUTs are observed. Also, for the case of implementing a fuzzy-inference controller with 81 inference rules (9 Inp./Out.), up to 82 percent improvement in the hardware area is achieved. Power and energy consumption are reduced up to 46 and 67 percent, respectively. For the FPGA-based design for this case the number of occupied LUTs is reduced up to 94% with the proposed design compared to the conventional binary design. As can be seen, the rate of energy saving decreases by increasing the data-width as the number of processing cycles in the proposed design increases by increasing the precision of data. Therefore, the proposed design offers a significant saving in the hardware area and power costs for all data-widths, and improved energy consumption for low data bit-widths.

The subject matter of the present invention is described with specificity herein to meet statutory requirements. However, the description itself is not intended to necessarily limit the scope of claims. Rather, the claimed subject matter might be embodied in other ways to include different steps or combinations of steps similar to the ones described in this document, in conjunction with other present or future technologies.

Modifications, additions, or omission may be made to the systems, apparatuses and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to a member of a set or each member of a subset of a set.

Furthermore, the described features, structures, or characteristics may be combined in any suitable manner in one or more embodiments. Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment.

Moreover, the terms "substantially" or "approximately" as used herein may be applied to modify any quantitative representation that could permissibly vary without resulting in a change to the basic function to which it is related.

We claim:

1. An architecture for performing fuzzy interference in unary computing systems, comprising:
   a fuzzification module;
   a unary number generator;
   a rule-apply module;
   an aggregation module; and
   a defuzzification module, comprising:
      one or more inputs comprising aggregated values;
      a database comprising at least one prestored value;
      a one-hot decoder; and
      a MUX unit;
      wherein the aggregated values comprise one or more outputs from the aggregation module;
      wherein the aggregated values further comprise corresponding unary bit-streams; and
      wherein the one-hot decoder comprises functionality to detect which unary bit-stream has the maximum value.

2. The architecture of claim 1, wherein the unary number generator comprises:
   a down counter; and
   two or more comparators.

3. The architecture of claim 1, wherein the unary number generator consists of:
   one down counter; and
   two or more comparators.

4. A method for performing fuzzy interference in unary computing systems, comprising:
   a. providing an architecture, comprising:
      a fuzzification module;
      a unary number generator
      a rule-apply module;
      an aggregation module; and
      a defuzzification module;
   b. performing a fuzzification process by the fuzzification module, comprising converting one or more crisp inputs to one or more fuzzy linguistic values;
   c. converting numbers in a range of [0,1] of the fuzzy linguistic values to unary bit-streams by the unary number generator;
   d. applying one or more inference rules by the rule-apply module;
   e. aggregating one or more outputs of the rule-apply module; and
   f. performing a defuzzification process by the defuzzification module, wherein the fuzzy linguistic values are converted to one or more crisp value outputs.

5. The method of claim 4, wherein the unary number generator comprises:
   a down counter; and
   two or more comparators.

6. The method of claim 4, wherein the crisp input conversion is based on an input membership function.

7. The method of claim 4, wherein the unary number generator consists of:
one down counter; and
two or more comparators.

8. The method of claim 4, wherein the defuzzification module comprises:
one or more inputs comprising aggregated values;
a database comprising at least one prestored value;
a one-hot decoder; and
a MUX unit;
wherein the aggregated values comprise one or more outputs from the aggregation module; and
wherein the aggregated values further comprise corresponding unary bit-streams.

9. The method of claim 8, further comprising:
transmitting the unary bit-streams corresponding the aggregated values to the one-hot decoder;
detecting the unary bit-stream with the maximum value by the one-hot decoder;
upon the one-hot decoder detecting the maximum value unary bit-stream, a corresponding index of the maximum value unary bit-stream is sent to the MUX unit; and
the MUX unit selects a corresponding defuzzification value.

10. The method of claim 8, wherein the unary bit-stream with the maximum value comprises the bit-stream that generates a 1 in the respective bit-stream first before the other unary bit-streams.

\* \* \* \* \*